United States Patent [19]

Blahut et al.

[11] Patent Number: 4,484,260
[45] Date of Patent: Nov. 20, 1984

[54] STORED-PROGRAM CONTROL MACHINE

[75] Inventors: Donald E. Blahut, Holmdel; Marc L. Harrison, Morganville, both of N.J.

[73] Assignee: AT&T Bell Laboratories, Murray Hill, N.J.

[21] Appl. No.: 331,689

[22] Filed: Dec. 17, 1981

[51] Int. Cl.³ .............................................. G06F 9/22
[52] U.S. Cl. ..................................... 364/716; 364/900
[58] Field of Search ....................... 364/716, 200, 900;
307/465; 340/825.83

[56] References Cited

U.S. PATENT DOCUMENTS 4,034,356  7/1977  Howley et al. ...................... 364/716
4,037,089  7/1977  Horningen .......................... 364/716
4,399,516  8/1983  Blahut et al. ....................... 364/716

*Primary Examiner*—Gary Chin
*Assistant Examiner*—Thomas G. Black
*Attorney, Agent, or Firm*—Herbert M. Shapiro

[57] ABSTRACT

A microprocessor with a hierarchical PLA control arrangement with a relatively rich function capability is achieved by applying the same subsection of the bit field of the output register of a control PLA to the inputs of each of the controlled PLA's. In addition, routing bits in the output register of the control PLA are applied to gate the clocks at the inputs of the controlled PLA's. Significant increase in PLA function, relative to PLA size, is achieved.

4 Claims, 4 Drawing Figures

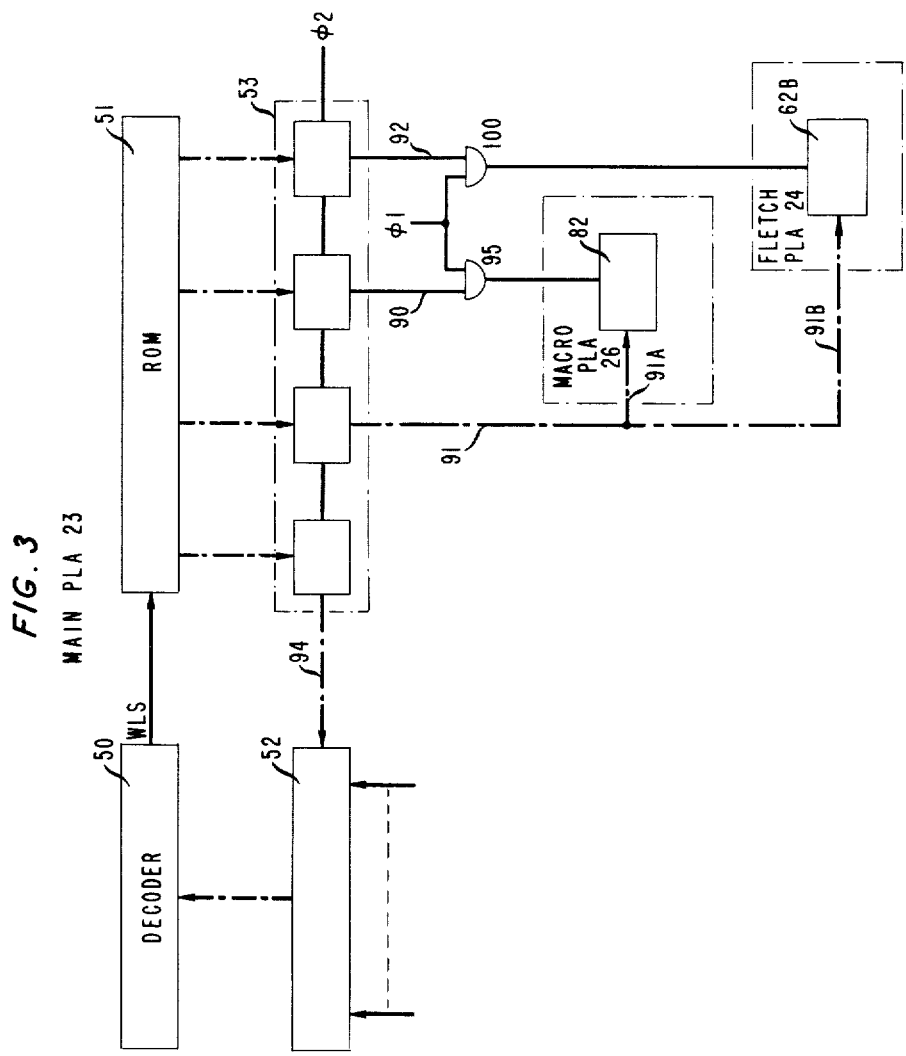

STORED-PROGRAM CONTROL MACHINE

FIELD OF THE INVENTION

This invention relates to stored-program control machines and, more particularly, to hierarchical PLA control arrangements for such machines.

BACKGROUND OF THE INVENTION

Copending application, Ser. No. 233,107 now abandoned, filed Feb. 10, 1981 for Marc L. Harrison discloses the use of logic circuitry for processing data during unused clock time between master and slave latches. Copending application Ser. No. 233,143, now U.S. Pat. No. 4,399,516, filed for D. E. Blahut-M. L. Harrison-M. J. Killian-M. E. Thierbach on the same date as that application, discloses the use of logic circuitry between master and slave latches to permit the use of programmed logic arrays (PLA's) of reduced size in microprocessors to perform the function of relatively large prior art PLA's. The latter application also teaches the implementation of a hierarchical PLA control arrangement for microprocessors.

In the latter application, the gating of clock pulses applied to the input register of a PLA, particularly when under the control of another PLA, permitted a relatively enriched repertoire of actions to be orchestrated by a PLA of a given size. The application also disclosed the gating of data into an input register of a PLA under the control of a second PLA. Arrangements of the type disclosed were shown to permit, inter alia, a reduction of 25 percent in PLA area. But surface area of integrated circuit chips is continually at a high premium. Consequently, a constant problem for the integrated circuit designer is implementing increasing numbers of functions with less and less chip surface area.

BRIEF DESCRIPTION OF THE INVENTION

The foregoing problem is solved in an illustrative embodiment by interconnecting a plurality of PLA's in a single chip of semiconductor material such that the same portion of the bit field of the output register of one PLA is applied to the input register of second and third PLA's. Further, clock pulses applied to the input registers of the second and third PLA's are gated under the control of associated other bits of the bit field. Consequently, the same portion of the bit field may be utilized to achieve a relatively rich control repertoire without necessitating a large PLA structure.

BRIEF DESCRIPTION OF THE DRAWINGS

FIG. 3 shows a schematic representation of a portion of the arrangement of FIG. 2.

DETAILED DESCRIPTION

Figure 1:
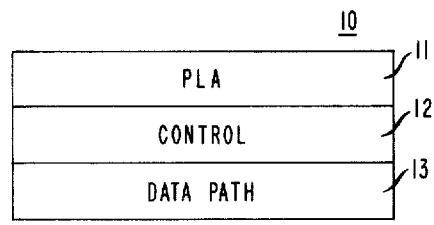
FIG. 1 shows a schematic representation of a single semiconductor chip in which a microprocessor is defined.

FIG. 1 shows a schematic semiconductor integrated circuit microprocessor 10. The microprocessor is organized into PLA, control, and data path portions 11, 12, and 13, respectively. We are directing our attention herein to the organization of the PLA and control portions of the microprocessor and to the manner in which the operation of the microprocessor is controlled by that organization.

Figure 2:
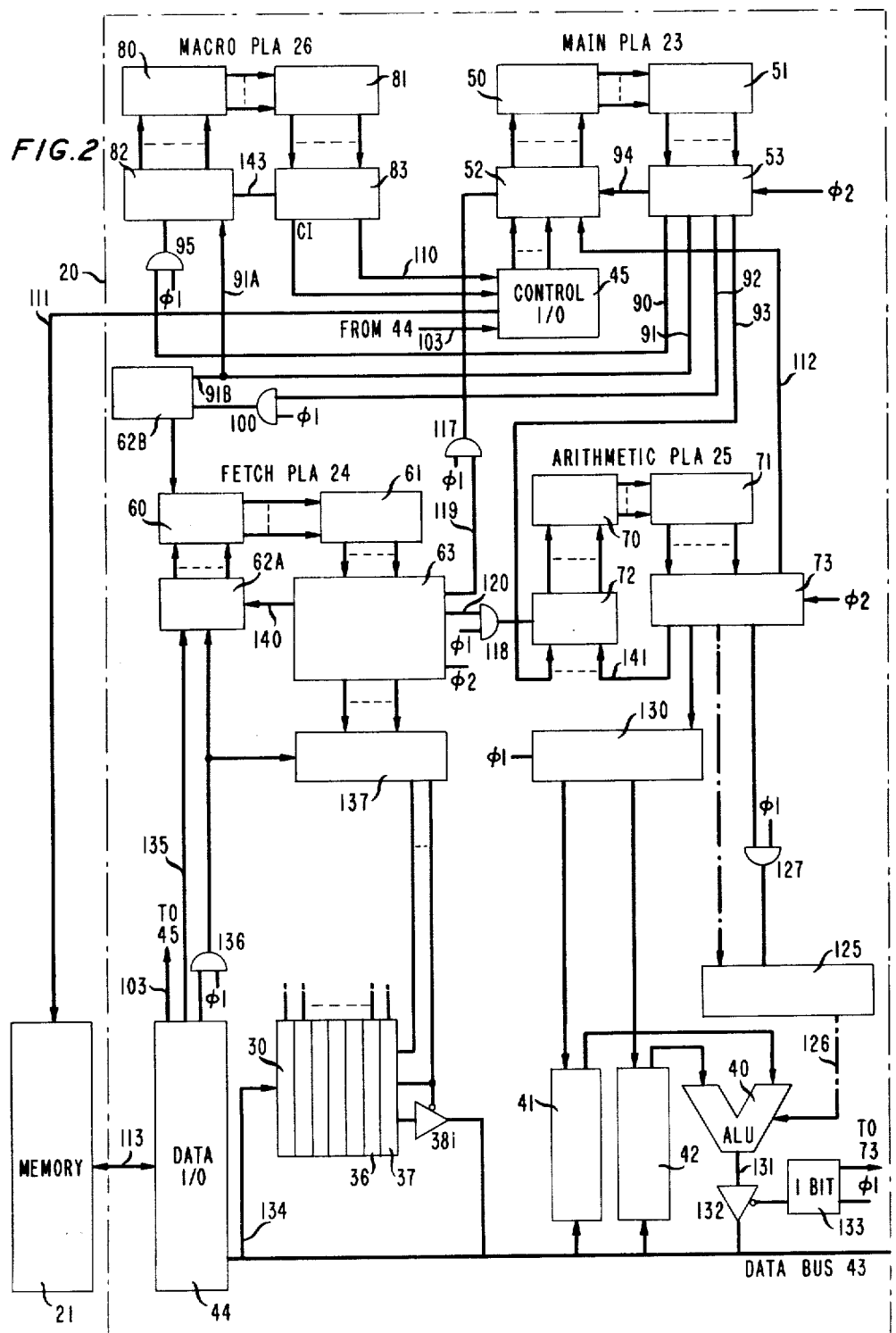
FIG. 2 shows a schematic representation of a hierarchical PLA arrangement in accordance with an embodiment of this invention.

FIG. 2 shows a portion of a microprocessor 20 enclosed within the broken line and a memory 21 external to the microprocessor. The microprocessor includes a MAIN PLA 23, a FETCH PLA 24, an ARITHMETIC PLA 25, and a MACRO PLA 26. PLA 24 is associated with user registers 30, 31, 32 . . . 37 and with associated tri-state buffers 38i. PLA 25 is associated with arithmetic logic unit 40. The microprocessor also includes two temporary registers 41 and 42 and data bus 43 controlled by PLA 25. Data and control inputs and outputs (I/O) are designated 44 and 45.

Each PLA includes a decoder and a ROM with associated input and output registers, respectively. Specifically, PLA 23 includes decoder 50, ROM 51 and associated input and output registers 52 and 53, respectively. PLA 24 includes decoder 60, ROM 61, input register 62 (A and B) and output register 63. Similarly, PLA 25 includes decoder 70, ROM 71, input register 72 and output register 73. PLA 26 includes decoder 80, ROM 81, input register 82 and output register 83.

The outputs of the MAIN PLA 23 are connected to the inputs of PLA's 24, 25, and 26 for coordinating the operation of those PLA's. Specifically, output register 53 of PLA 23 has a number of output fields having different numbers of bits as is discussed more fully hereinafter in connection with FIG. 3. Those different fields are applied to single and multibit output lines represented by lines 90, 91, 92, 93, and 94. Line 90 represents a single bit output field and is connected to an input to an AND circuit 95. A clock (not shown) is connected to another input of circuit 95 in a manner to apply a $\phi_1$ clock pulse. We will adopt the convention herein that $\phi_1$ and $\phi_2$ clock pulses are applied to input and output registers of a PLA, respectively. The output of AND circuit 95 is applied to the clock input of register 82 of PLA 26.

Line 91 (multibit) is bifurcated into lines 91A and 91B. Line 91A is connected to the (data) inputs of register 82 of PLA 26. Line 91B is connected to the (data) inputs of registers 62B of PLA 24. Register 62 is shown in two parts, 62A and 62B, herein to represent the condition that the data bits in each of the two parts can be inhibited (clocked) independently as is discussed more fully hereinafter. Line 92 is connected to an input of an AND circuit 100. The clock is connected to another input of AND circuit 100 to apply a $\phi_1$ pulse as indicated. The output of AND circuit 100 is connected to the (clock) input of register 62B. Line 93 is connected to input register 72 of PLA 25. MAIN PLA 23 thus can be seen to apply its output to the three other PLA's shown in FIG. 2 with the outputs represented by line 91 being applied selectively to either or both of PLA's 24 and 26 for achieving a requisite number of actions with a relatively small PLA.

The MAIN PLA orchestrates the overall cooperation of the remaining PLA's in the illustrative embodiment of FIG. 2 in response to opcodes (instructions) which are supplied either by I/O 44 via line 103 or by MACRO PLA 26 via line 110 through control I/O 45. The control I/O, in turn, is responsive to control input CI from output register 83 of PLA 26. Line 111 represents multibit field connections between control I/O 45 and memory 21 used to control the memory. The multibit field represented by line 110 is connected between control I/O 45 and register 83. Line 113 connects memory 21 and I/O 44 representing the multibit field (address and data) as is common in microprocessors.

PLA's 23, 24 and 25 are interconnected with one another. Output register 73 of PLA 25, for example, is adapted to apply outputs to input register 52 of PLA 23 as represented by line 112. Output register 63 of PLA 24, further, is adapted to apply single bit outputs to inputs to AND circuits 117 and 118 as represented by lines 119 and 120, respectively. The clock is connected to apply $\phi_1$ pulses to the other input to each of those AND circuits. The outputs of AND circuits 117 and 118 are connected to clock inputs of registers 52 and 72, respectively. Thus, the various PLA's are interconnected herein to be responsive to signals for activating one another and for signalling task completion (handshaking).

Each PLA has at least one specific task, the several PLA's cooperating to complete data processing composed of several specific tasks in concert. The arithmetic PLA, for example, operates to control arithmetic functions. To this end, five outputs from output register 73 of PLA 25 are connected to the five data inputs of register 125. Outputs of register 125 are connected to inputs of ALU 40 as represented by line 126. ALU 40 performs AND, OR, ADD, SUBTRACT, and COMPLEMENT functions. A single bit output of register 73 of PLA 25 is applied to an input of an AND circuit 127, the other input to which the clock applies a $\phi_1$ pulse. The output of AND circuit 127 is connected to register 125 for loading register 125 with a particular ALU function code.

Outputs of register 73 are connected to a slave latch 130 operative in a $\phi_1$ clock phase as indicated. The outputs of latch 130 are applied to control inputs to temporary registers 41 and 42. Data bus 43 also is connected to data inputs of registers 41 and 42. Outputs of registers 41 and 42 are connected of ALU 40. Arithmetic PLA 25 thus is interconnected to move data from the data bus to registers 41 and 42 and from registers 41 and 42 to ALU 40 and to determine, via register 125, one of five different operations to be carried out on the data so moved. The (multibit) result of the operation is applied to data bus 43 over line 131. Line 131 is connected to an input to tri-state buffer 132, the output of which is connected to the data bus. Device 132 is activated by an output from slave latch 133. Inputs to latch 133 are from register 73 and the clock during a $\phi_1$ phase as indicated.

The fetch PLA (24) is operative to move selected data to the data bus for latching into temporary registers 41 and 42 under control of PLA 25. That data may originate from memory 21 or from user registers 30-37 in the illustrative embodiment. User registers 30-37 are filled by data applied to (multibit) input 134 in a well-known manner. To implement data fetch operations herein, outputs of data I/O 44 are connected to inputs of input register 62A of PLA 24 as represented by line 135. A single bit output of data I/O 44 is applied to an input of AND circuit 136. The other input to AND circuit 136 is connected to the clock for applying $\phi_1$ clock pulses. The output of AND circuit 136 is applied to clock inputs of input register 62A and to slave latch 137 for selectively applying $\phi_1$ clock pulses thereto. Output register 63 of PLA 24 applies an output bit field to inputs of slave register 137 latched in a $\phi_2$ clock phase as indicated in the Figure. If loaded in the next subsequent $\phi_1$ phase, register 137 activates tri-state buffers 38i for applying the contents of a selected user register (30-37) to data bus 43 for movement to a temporary register (41 or 42). Note that as many buffers 38i are used as there are bits on the data bus. Data moved for processing under the control of PLA 25 is returned to a user register selected by PLA 24 via data bus 43 and line 134.

MACRO PLA 26 is operative to apply a sequence of instructions to MAIN PLA 23 via control I/O 45 in response to a signal from MAIN PLA 23 on line 91, if AND circuit 95 is enabled by a signal on line 90. PLA 26 can be visualized, thus, as a source of subroutines of successive instructions to which PLA 23 responds to coordinate fetch and arithmetic operations.

The various PLA's have feedback loops typical of PLA's in order to enable each successive state of the PLA to reflect the preceding state. The feedback loops are represented by line 94 in PLA 23 and by lines 140, 141 and 143 in PLA's 24, 25 and 26, respectively.

The illustrative operation is assumed, arbitrarily, to start on a $\phi_1$ clock cycle at which time the MAIN PLA 23 is assumed to receive a valid input (opcode) from control I/O 45 (reset) or data I/O 44. On the next subsequent phase $\phi_2$, PLA 23 outputs a command to MACRO PLA 26. On the next subsequent $\phi_1$ phase, MAIN PLA waits and the MACRO PLA receives the command. The MACRO PLA applies a command to the MAIN PLA on the next phase $\phi_2$.

The third cycle of operation starts with the MAIN PLA latching the command from the MACRO PLA during a phase $\phi_1$. In the next $\phi_2$ phase, the MAIN PLA applies valid output commands to the FETCH and ARITHMETIC PLA's.

The FETCH and ARITHMETIC PLA's receive valid input commands during phase $\phi_1$ of the fourth cycle of operation. During the following $\phi_2$ phase, the FETCH PLA enables the first selected user register (30-37), the ARITHMETIC PLA enables the first temporary register (41 or 42) to receive data from the bus and the MAIN PLA outputs the second valid commands. Handshake (assert data valid) signals are applied to AND circuits 118 and 100 of PLA's 25 and 24, respectively.

In the next phase $\phi_1$, the FETCH and ARITHMETIC PLA's receive second valid input commands. In the following phase $\phi_2$, the FETCH PLA enables the second selected user register. ARITHMETIC PLA enables the second temporary register to receive data from the bus and asserts data valid during that cycle.

In the next phase $\phi_2$, the ALU applies valid outputs to the bus via tri-state buffer 132 and the FETCH PLA latches data from the selected bus to the user register. Line 110 from the MACRO PLA (26) to control I/O 45 enables/disables opcodes from data I/O 44. So long as the MACRO PLA contains additional commands for the MAIN PLA, the State Machine loops back to cycle 3 at the conclusion of the execution of each command. When MACRO PLA determines that it has no more commands to give MAIN PLA, it re-enables opcodes from I/O via line CI. The MAIN PLA then loops to cycle 1 instead of 3 in Table 1. The illustrative operation is now complete and is summarized in the following table.

TABLE I

| Cycle | Phase | Action |
|---|---|---|
| 1 | $\phi_1$ | Main PLA receives first valid opcode from control I/O 45. |

TABLE I-continued

| Cycle | Phase | Action |
|---|---|---|
|  | $\phi_2$ | Main PLA outputs command to MACRO PLA. |
| 2 | $\phi_1$ | Main PLA waits. MACRO PLA sees command. |
|  | $\phi_2$ | MACRO PLA outputs command to Main PLA. |
| 3 | $\phi_1$ | Main PLA latches command from MACRO PLA. |
|  | $\phi_2$ | Main PLA applies valid output commands to Fetch and Arithmetic PLA's. |
| 4 | $\phi_1$ | Fetch and Arithmetic PLA's have valid input command. |
|  | $\phi_2$ | Fetch PLA enables first selected user register; Arithmetic PLA enables first temporary register to receive data from bus; Main PLA outputs 2nd valid commands; assert data valid. |
| 5 | $\phi_1$ | Fetch and Arithmetic PLA's receive second valid input command. |
|  | $\phi_2$ | Fetch PLA enables second selected user register. Arithmetic PLA enables second temporary register to receive data from bus; assert data valid. |
| 6 | $\phi_1$ | Temporary registers apply input data to ALU. |
|  | $\phi_2$ | ALU applies valid output data to bus, Fetch PLA latches data from bus to user register. |

FIG. 3 shows a schematic illustration of the MAIN PLA with an illustrative 14 output bits from output register 53 of ROM 51 therein. The bits are organized into fields of six, six, one and one and are applied as represented by lines 94, 91, 90 and 92, respectively, as indicated in the Figure. It is important to note that six bits are applied to line 91 and then to both lines 91A and 91B to the MACRO and the FETCH PLA's respectively. But the six bits are routed by the bits in lines 90 and 92. For example, if line 90 is high (a binary one) AND circuit 95 is activated and the six bits on line 91A are clocked into input register 82 of MACRO PLA 26. If line 92 were high, on the other hand, AND circuit 100 is activated on the next $\phi_1$ phase and the six bits are clocked into input register 62B of PLA 24. If both line 90 and line 92 are low (binary zeros), the six bits are clocked into neither the MACRO nor the FETCH PLA. It should be clear then that the six bits (or a single bit field) on line 91 are clocked into either one, both, or neither of the MACRO and FETCH PLA's in response to 1-0, 0-1, 1-1, or 0-0 codes on lines 90 and 92.

The illustrative operation is achieved with 14 output bits rather than with 18 output bits, as would have been required by a prior art arrangement without the ability to selectively apply the same bit field to multiple input registers selectively.

A reduction in the number of output lines in PLA 23 of over 20 percent is achieved over the prior art arrangement. Not only is the savings in terms of the number of outputs for the PLA, but also the number of output lines in the PLA ROM section is reduced. This reduction leads to a savings in PLA area approaching 50 percent for PLA's of representative size as well as leading to a concomitant increase in speed of operation.

Figure 4:
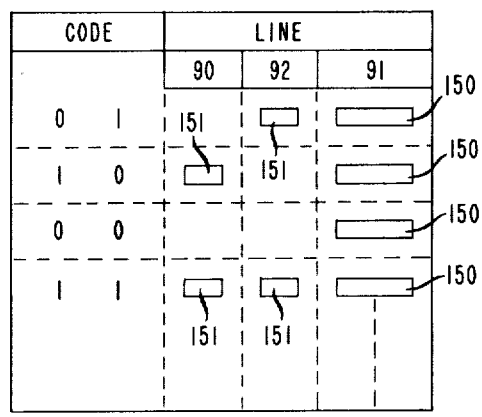
FIG. 4 shows a schematic view of the data content of one representative PLA in accordance with the embodiment of FIG. 2.

The savings in size and speed is illustrated above in terms of four PLA's where the same portion of a bit field of the output register of one PLA is routed to the input of two of the three other PLA's, as dictated by routing bits in the output register of the first PLA. FIG. 4 illustrates this savings. For example, if we accept rectangles 150 of FIG. 4 as representing the bit field on line 91 of FIG. 3, and we let square 151 represent a routing bit on lines 90 and/or 92 in each instance, then it is easy to visualize that consecutively lower lines in the Figure represent the same data (150) being routed to the input registers of different PLA's via line 91. For the embodiment shown in FIGS. 2 and 3, the top two lines of FIG. 4 represent the bits being routed to PLA 24 by a routing bit in the top line of FIG. 4 and to PLA 26 by a routing bit in the second line. Of course, an even greater saving in PLA area and speed is achieved if more than two PLA's receive the same portion of a bit field. For example, with a bit field of nine bits, only thirteen bits are required to route the bit field to four recipient PLA's. Actually, for embodiments with four or more recipient PLA's the four (or more) routing bits can be encoded so that, in practice, only eleven bits need be used. Of course, the coding may be designed to communicate (clock) a bit field to more than one PLA at a time. This is to be contrasted with a prior art PLA which would require 36 output bits and thus 36 output lines in the ROM section of the PLA to implement the same set of actions. It is not necessary that all bits of a bit field be routed to multiple PLA's. In practice, different bit fields sharing one or more bits (in common) may be useful.

*Introduction to VLSI Systems*, by Carver Mead and Lynn Conway, Published by Addison-Wesley Publishing Company, Inc. in 1980, at page 81 shows a PLA with an AND plane (decoder) and an OR plane (ROM) and input and output registers of the type employed herein.

What has been described is considered merely illustrative of the principles of this invention. Accordingly, various embodiments of this invention can be devised by those skilled in the art in accordance with those principles yet within the spirit and scope of the following claims. For example, the same bit field of a first PLA has been described as applied selectively to two or more recipient PLA's. Of course, the first PLA also may be one of the recipient PLA's as well. Further, the principles of the invention may be applied generically to encoders of which PLA's are examples.

What is claimed is:

1. A stored-program control machine for providing consecutive sets of control signals for controlling the datapath of a microprocessor, said machine comprising first, second and third encoders, first, second and third input registers each connected to the like-designated encoders and responsive to a first clock signal for applying coded input signals to the like-designated encoder, first, second and third output registers each also connected to said like-designated encoders and responsive to a second clock signal for providing coded outputs from said like-designated encoders, said first output register having a bit field including at least first, second and third portions of M, K, and J bits respectively, said machine including a control source for applying said coded input signals and clock means for applying said first and second clock signals to said first, second and third input registers, and said first, second and third output registers respectively, means for applying the bits of said first portion to said second and third input registers in the presence of said first clock signal, said machine also including gate means for gating said output registers during said second clock signal, said gate means being responsive to said bits of said first portion for applying said bits of said second and third portions to said second and third input registers when said first clock signal next occurs.

2. A stored program control machine in accordance with claim 1 defined in an integrated semiconductor chip.

3. A stored program control machine in accordance with claim 2 wherein said encoders are PLA's.

4. A stored program control machine in accordance with claim 3 where $M>2$ and $k=j=1$.

* * * * *